United States Patent Office 3,255,264
Patented June 7, 1966

3,255,264
PREPARATION OF HEXACHLOROCYCLO-
PENTADIENE DIMER
Kenneth Tracey, Niagara Falls, N.Y., assignor to Hooker
Chemical Corporation, Niagara Falls, N.Y., a corporation of New York
No Drawing. Filed Apr. 3, 1962, Ser. No. 184,660
5 Claims. (Cl. 260—648)

The present invention is concerned with a process for the condensation of hexachlorocyclopentadiene with an unsaturated cyclic dieneophilic compound having five carbon atoms in the ring, in the presence of aluminum chloride.

The products of the aforesaid process are valuable as chemical intermediates for organic synthesis, for solvent uses and for the preparation of toxic substances such as insecticides, fungicides, etc.

It has heretofore been the practice to mix about equimolar quantities of hexachlorocyclopentadiene and a five-carbon atom unsaturated cyclic dieneophilic compound with a solvent reaction medium such as hexachlorobutadiene, carbon disulfide, petroleum ether, perchloroethylene, carbon tetrachloride, etc. Then, a catalyst of aluminum chloride was added to the reaction mixture and the mixture heated sufficiently to cause the condensation as aforesaid. The reaction mixture was stirred mechanically in order to reduce the reaction time.

The disadvantages of the prior practice, however, are that a considerable amount of time is required in order to get a suitable yield, and even suitable yields under the prior process leave much to be desired.

It is, therefore, an object of this invention to increase the yield of the present condensation reaction;

Yet another object of this invention is to appreciably reduce the reaction time of the present process over the prior art.

Other objects and advantages of this invention will become apparent from a consideration of the detailed specification to follow.

The present invention contemplates carrying out the reaction of hexachlorocyclopentadiene with itself in the absence of a solvent and in which the reaction mixture is agitated sufficiently to prevent caking of the solid product which forms. According to the present invention, the starting material is put into a reaction vessel, aluminum chloride added, and the mixture heated and mechanically agitated sufficiently to thoroughly mix the reactants and catalyst and, moreover, to constantly blend and mix the reaction medium as the reaction proceeds. In this condensation reaction, the starting material proceeds from a liquid state to a semi-solid and finally to a solid. It has been found that the reaction will go substantially to completion, and a very high yield will result if the solids formed in the reaction are broken up, while the reaction is occurring. It is to be understood, of course, that mixing in the first stage of the reaction is not critical since the reactant is liquid, and the catalyst is easily mixed or dispersed homogeneously therewith. The middle semi-solid stage of this reaction is still not critical, as good mixing can be achieved with suitable stirring. It is, however, the latter stage of this reaction which is important to this invention. In the latter stage, most of the material has already reacted, resulting in a solid product. This solid interferes with the reaction of the remaining liquid under the influence of the catalyst. Therefore, if the solid product is broken up by sufficient agitation, the reaction will go substantially to completion as aforesaid, and result in a product of very high purity.

This invention is most conveniently practiced by placing the liquid starting materials in a sigma blade mixer and subsequently adding the aluminum chloride catalyst. Under the influence of the blending action of the mixer blades, the material is sufficiently kneaded and such solids as are formed break up so that no caking results. The final product which comes from this reaction is a powdery solid.

The proportion of catalyst employed in this invention may vary from about two percent to about equimolar with hexachlorocyclopentadiene, though there is no advantage in employing more than five to ten percent due to the difficulty in removing the catalyst subsequent to the completion of the reaction. The preferred range is two to ten percent catalyst.

The temperature useful in the present invention may range from about sixty-five degrees centigrade up to about two hundred and fifty degrees centigrade. The generally preferred range of temperature is from about sixty-five degrees to about ninety degrees centigrade; still more preferred, is a temperature range from seventy to seventy-five degrees centigrade. It is to be understood, however, that this reaction is highly exothermic and thus to insure carrying out the reaction at a more or less constant temperature, some cooling means must be provided. It is also in connection with the temperature control of the reaction that the amount of catalyst be limited to no more than five or ten percent. More catalyst than this speeds up the reaction to the point where the cooling means provided may not be able to keep up with its task of controlling the reaction temperature within reasonably constant limits.

It should also be realized that the reaction temperature can be raised up to the aforementioned two hundred and fifty degrees. However, carrying out the reaction at this temperature results in the formation of dark, tarry products. When the reaction is carried out at relatively high temperatures the reaction is complete in a matter of minutes, but results in an impure product. In this invention the end objective of a very pure end product is obtained by keeping the reaction temperatures no higher than ninety degrees centigrade. The ninety-degree temperature can, of course, be exceeded if the resulting additional impurities in the product can be tolerated.

The following examples illustrate the practice of the invention, but are not to be construed as limiting the same:

TABLE

| Exp. | Percent AlCl$_3$ | °C. Reaction Temp. | °C. Max. Temp. | Hours Reaction Time | Percent Recovery Crude Dimer | Percent Recovery After Washing, Drying and Grinding | Percent C$_{10}$C$_{12}$ in Dry Dimer |
|---|---|---|---|---|---|---|---|
| 1* | 3 | 80 | 95 | 6.0 | 98.0 | 91.0 | 93 |
| 2 | 5 | 60-75 | 140 | 5.0 | 92.0 | 98.2 | 98 |
| 3 | 5 | 69 | 71 | 4.0 | 94.0 | 98.5 | 98 |
| 4 | 5 | 80 | 84 | 5.0 | 99.1 | 76.0 | 95 |
| 5 | 5 | 79-80 | 82 | 6.5 | 86.0 | 86.0 | 95 |
| 6 | 5 | 80 | 84 | 5.0 | 101.0 | 86.0 | 97 |
| 7 | 5 | 80 | 88 | 7.5 | 91.5 | 94.0 | 97 |
| 8 | 5 | 80 | 84 | 4.5 | 106.5 | 96.0 | 96 |
| 9 | 5 | 80-81 | 87 | 12.0 | 95.3 | 92.0 | 97 |
| 10 | 10 | 79-82 | 82 | 2.5 | 96.5 | 92.0 | 97 |
| 11 | 10 | 81 | 87 | 2.5 | 89.1 | 84.0 | 97 |
| 12 | 10 | 82 | 110+ | 1.0 | 96.4 | 94.0 | 96 |

*1000 g. starting batch.

The examples set forth in the preceding table are mostly self-explanatory and require little explanation. The first experiment was conducted with a 1000-gram batch of starting material. The remaining examples were conducted with 50-pound batches of starting material, plus or minus one-half pound. The maximum temperature given in the third column is invariably higher than the reaction temperature given in the column immediately preceding, and results from the fact that the reaction is highly exothermic as aforementioned. The "Hours Reaction Time" represent the actual time that the reactants are held at the temperature aforementioned. The recovery of crude material is simply based upon the amount of material put in and low figures simply reflect the fact that not all of the reactant was removed from the sigma blade mixer subsequent to the reaction. On the other hand, any figures over one hundred percent reflect the inclusion of material left over from a previous experiment. The percentage recovery after washing, drying and grinding is based upon the fact that certain materials are washed out by water, mainly, the aluminum chloride catalyst. The last column represents the purity of the finished product.

The experiments of the preceding table were carried out in a five-gallon, Read Standard sigma blade mixer and the temperatures were obtained either with a thermobulb positioned inside the mixer or actually measured with a thermometer.

The product resulting from the examples set forth in the table is a tan solid which yields a white solid which upon recrystallization from benzene sublimes above 240° centigrade without melting.

Another factor which affects the purity of the yield in this case which is not readily apparent is the heat transfer characteristics of the product. Heat transfer while the reactants are still in the liquid or semi-solid stages is fairly good, but decreases to a minimum at the end of the run when the reaction has gone almost to completion. Thus, care must be exercised to avoid overheating or dark, tarry products will result.

The mixer in this invention was provided with a jacket for circulating cooling water around the blades and the reacting mixture.

It will be apparent that this invention gives better yields than those obtained in the solvent process for conducting this reaction and, moreover, gives such yields in less time than was the case with the old solvent method, the only sacrifice being a very slight decrease in the purity of the final product.

The foregoing has been descriptive of the present invention, but is not to be construed as limiting the same.

I claim:

1. A method for manufacturing a dimer of hexachlorocyclopentadiene which comprises reacting hexachlorocyclopentadiene with itself, in the absence of a solvent and in the presence of a catalytic amount of aluminum chloride for the dimerization of hexachlorocyclopentadiene to $C_{10}Cl_{12}$, at a temperature from about 65 degrees centigrade to about 90 degrees centigrade for about two to twelve hours, during which time a solid product forms, kneading the reaction mixture containing the solid product to maintain the solid product dispersed and in a non-caked condition with the aluminum chloride kept thoroughly mixed with the reactants, continuing the reaction while the reaction mix containing solid product is being kneaded in contact with the aluminum chloride catalyst and halting the reaction and removing the catalyst to produce a product of about 95 to 98 percent purity in yields above about 85 percent.

2. A method for manufacturing a dimer of hexachlorocyclopentadiene of high purity in high yields which comprises reacting hexachlorocyclopentadiene with itself, in the absence of a solvent and in the presence of about 2 to 10 percent of aluminum chloride catalyst for the dimerization of hexachlorocyclopentadiene to $C_{10}Cl_{12}$ at a temperature from about 65 degrees centigrade to about 90 degrees centigrade for about two to twelve hours, during which time the solid dimer forms, kneading the reaction mixture containing the solid product before it cakes, to maintain the solid product dispersed and in a non-caked condition with the aluminum chloride kept thoroughly mixed with the reactants, continuing the reaction while the reaction mix containing solid dimer is being kneaded in contact with the aluminum chloride catalyst and halting the reaction and removing the catalyst by washing it out with water, to produce a product of about 95 to 98 percent purity in yields above about 85 percent.

3. A process according to claim 2 in which the kneading of the reaction mixture, containing the solid dimer product, to maintain the solid product dispersed and in an uncaked condition with the aluminum chloride kept thoroughly mixed with the reactants, is effected by a sigma blade mixer.

4. The method of claim 3 wherein cooling water is circulated around the blades and the reacting mixture in the sigma blade mixer, to remove undesired excess heat of reaction and improve product quality and yield.

5. The method of claim 3 wherein the hexachlorocyclopentadiene is agitated in a sigma blade mixer and during such agitation aluminum chloride dimerization catalyst is added, to provide a good dispersion of the catalyst in the reaction mixture.

References Cited by the Examiner

UNITED STATES PATENTS 2,724,730   11/1955   Johnson _____ 260—648

OTHER REFERENCES

Prins, "Rec. des Trav. Chim des Pays-Bas," vol. 65 (1946).

LEON ZITVER, *Primary Examiner.*